United States Patent
Stegina et al.

[15] 3,657,680
[45] Apr. 18, 1972

[54] TEMPERATURE CONTROL SYSTEM AND CONTROLLER AND METHOD THEREFOR OR THE LIKE

[72] Inventors: Joseph M. Stegina, Orange; Edward Perry Cumming, Milford; Theodore Y. Korsgren, Orange, all of Conn.

[73] Assignee: Robertshaw Controls Company, Richmond, Va.

[22] Filed: Dec. 29, 1969

[21] Appl. No.: 888,522

[52] U.S. Cl. ............................................337/308, 337/323
[51] Int. Cl. ..................................H01h 37/18;, H01h 37/36
[58] Field of Search.................337/40, 124, 307, 308, 323, 337/320

[56] References Cited

UNITED STATES PATENTS

| | | | |
|---|---|---|---|
| 2,213,505 | 9/1940 | Raney | 337/320 |
| 2,849,577 | 8/1958 | Pfeiffer | 337/307 |
| 2,216,589 | 10/1940 | Grooms | 337/308 X |

*Primary Examiner*—Bernard A. Gilheany
*Assistant Examiner*—Dewitt M. Morgan
*Attorney*—Auzville Jackson, Jr., Robert L. Marben and Candor, Candoe & Tassone

[57] ABSTRACT

A housing carrying an actuator for controlling a heat exchanger and carrying a condition responsive means that is responsive to the output effect of the heat exchanger. Lever means operatively interconnect the condition responsive means to the actuator whereby the condition responsive means will tend to actuate the actuator when sensing an actuating condition of the heat exchanger and will tend to deactuate the actuator when sensing a heat actuating condition of the heat exchanger. An ambient temperature responsive device is operatively interconnected to the lever means to vary in relation to the ambient temperature sensed by the device only the deactuating condition that the condition responsive means must sense in operating the actuator so that at different ambient temperatures, the sensed temperature for causing the turn off of the heat exchanger will vary whereas the turn on temperature remains the same for any ambient temperature.

8 Claims, 10 Drawing Figures

INVENTORS
JOSEPH M. STEGINA
E. PERRY CUMMING
THEODORE Y. KORSGREN

BY

THEIR ATTORNEYS

Patented April 18, 1972
3,657,680
3 Sheets-Sheet 2
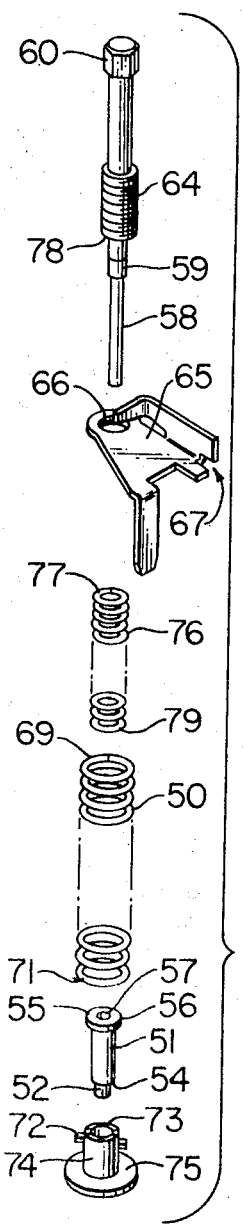
FIG. 7
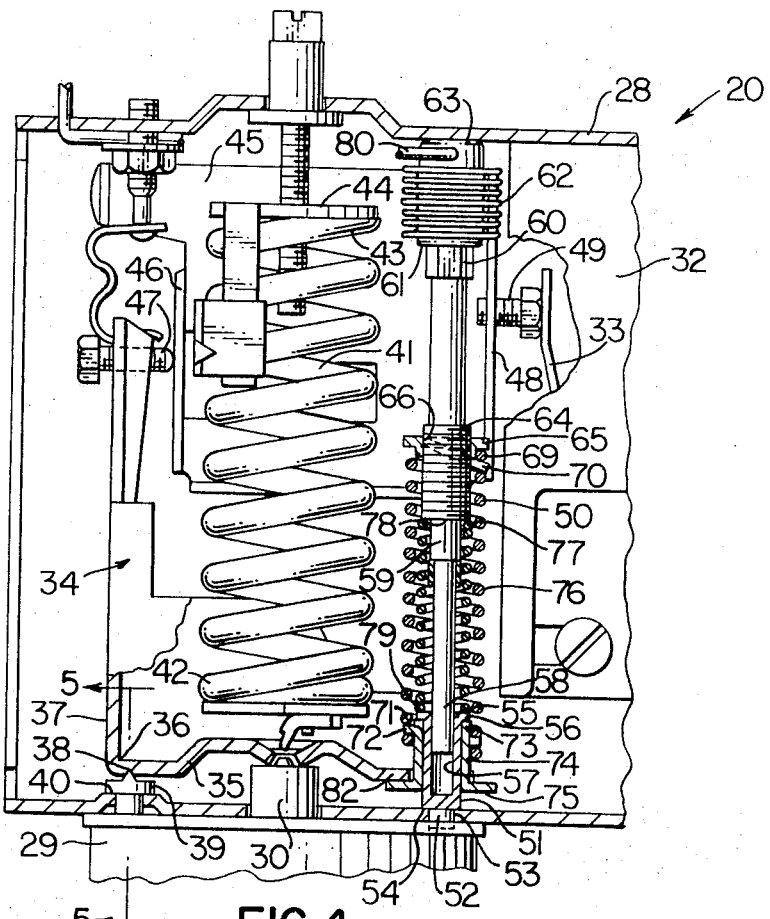
FIG. 4
FIG. 6
FIG. 5
INVENTORS
JOSEPH M. STEGINA
E. PERRY CUMMING
THEODORE Y. KORSGREN
BY
Cardes, Cardes & Tasem
THEIR ATTORNEYS Patented April 18, 1972

INVENTORS
JOSEPH M. STEGINA
E. PERRY CUMMING
BY THEODORE Y. KORSGREN

THEIR ATTORNEYS

TEMPERATURE CONTROL SYSTEM AND CONTROLLER AND METHOD THEREFOR OR THE LIKE

This invention relates to an improved temperature control system for a heat exchanger or the like as well as to an improved controller and method of operation.

It is well known from the United States patent to Good, U.S. Pat. No. 3,447,116, that a pressure or temperature regulator can be provided for a heat exhanger wherein a condition responsive means through lever means will actuate and deactuate an electrical switch with an adjustable differential between the actuation point temperature setting and the deactuation point temperature setting of the electrical switch that controls the operation of a heat exchanger.

However, it has been found according to the teachings of this invention that it would be desireable to vary at least one of the cut in or cut out conditions that such a controller is normally set to operate in relation to a varying condition other than that provided by the heat exhanger or the device being controlled thereby. For example, such auxiliary responsive means can be an ambient temperature compensation means.

In particular, it has been found that when utilizing a refrigeration control system for a beverage dispenser or the like, the sensed cut-in or turn-on temperature that is required to cause the heat exchanger to cool the beverage can remain constant whereas the sensed cut-out or turn-off temperature that is required to cause the heat exchanger to stop cooling the beverage should vary according to the ambient temperature. For example, when the sensed temperature of the refrigerant coil that cools the beverage to be dispensed reaches approximately 38° F., the heat exhanger should be turned on to cool the same. However, after the heat exchanger has been turned on, the same is turned off by the controller on a substantially straight line sliding scale where at higher ambient temperatures, the controller cuts out the heat exhanger when the temperature of the refrigerant coil is lowered to a higher temperature below the cut-in temperature than when the ambient temperature is lower.

In the embodiment of this invention, at respective ambient temperatures of 100° F., 90° F. and 50° F. the cut-out temperature of the refrigerant coil is approximately 22° F., 20° F., and 17° F.

One embodiment of the controller of this invention for providing the above functions comprises a housing carrying an actuator for controlling the heat exchanger and a condition responsive means being responsive to the output effect of the heat exchanger. Transmitting means operatively interconnects the condition responsive means to the actuator whereby the condition responsive means will tend to actuate the actuator when sensing an actuating condition of the heat exchanger and will tend to deactuate the actuator when sensing a deactuating condition of the heat exchanger. An ambient temperature responsive device is operatively interconnected to the transmitting means to vary in relation to the ambient temperature sensed by the device only the deactuating condition that the condition responsive means must sense to deactuate the actuator.

Accordingly, it is an object of this invention to provide an improved controller having one or more of the novel features set forth above or hereinafter shown or described.

Another object of this invention is to provide an improved control system having one or more of the novel features set forth above or hereinafter shown or described.

Another object of this invention is to provide an improved method for operating a heat exchanger, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 4 is an enlarged cross-sectional view of the controller of FIG. 1 and is taken on line 4—4 of FIG. 3.

FIG. 5 is a partial cross-sectional view of the controller of FIG. 4 and is taken on line 5—5 thereof.

FIG. 6 is an enlarged, fragmentary, cross-sectional view of the controller and is taken on line 6—6 of FIG. 3.

FIG. 7 is an exploded perspective view of certain parts of the controller of FIG. 1.

Figures 1, 2, 3:
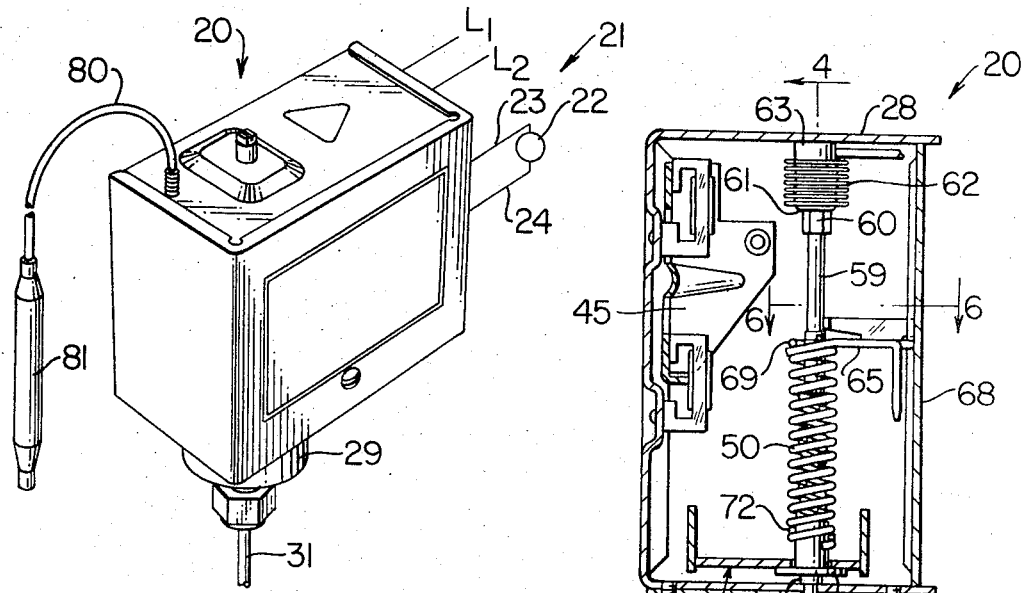
FIG. 1 is a top perspective view of the controller of this invention being utilized in a control system that is schematically illustrated in FIG. 1.
FIG. 2 is an enlarged side view of the controller of FIG. 1 with the side wall thereof removed.
FIG. 3 is a cross-sectional view taken on line 3—3 of FIG. 2.

While the various features of this invention are hereinafter described and illustrated as being particularly adapted to provide a controller that is responsive to temperature conditions, it is to be understood that the various features of this invention can be utilized singly or in any combination thereof to provide controller means being responsive to other conditions, such as pressures, etc., as desired.

Therefore, this invention is not to be limited to only the embodiment illustrated in the drawings, because the drawings are merely utilized to illustrate one of the wide variety of uses of this invention.

Referring now to FIG. 1, the improved controller of this invention is generally indicated by the reference numeral 20 and is illustrated schematically as being utilized to control a refrigerant control system generally indicated by the reference numeral 21 and comprising a heat exchanger 22 adapted to be turned on for a cooling operation by the controller 20 interconnecting power source leads $L_1$ and $L_2$ to the leads 23 and 24 of the heat exchanger 22 when the controller 20 senses that the temperature output effect of the heat exchanger 22 is above a desired or set output temperature effect thereof and will disconnect the power source leads $L_1$ and $L_2$ from the leads 23 and 24 to turn off the heat exchanger 22 when the controller 20 senses that the output temperature effect of the heat exchanger 22 has fallen below a predetermined temperature value.

However, as previously stated, the controller 20 will turn off or cut out the heat exchanger 22 on a straight line sliding scale in relation to the ambient temperature being sensed by the controller 20 in a manner hereinafter described.

Figure 10:
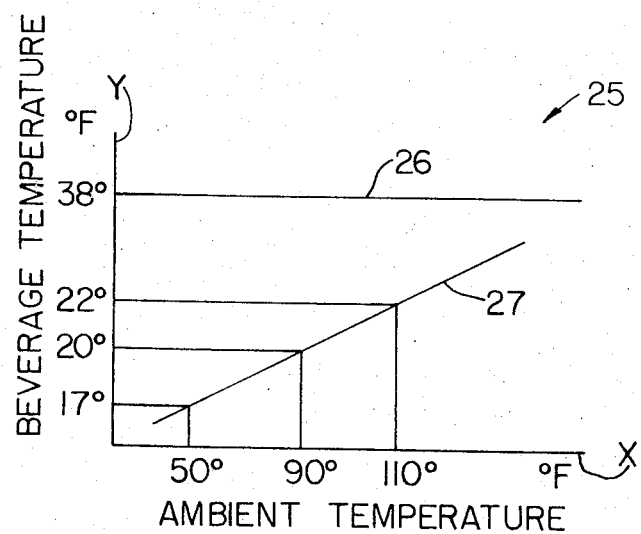
FIG. 10 is a chart illustrating one range of operation of the controller of this invention.

For example, reference is now made to FIG. 10 wherein a chart 25 is provided to illustrate the operation of one embodiment of the controller 20 of this invention. It can be seen from the chart 25 of FIG. 10 that the controller 20 will always turn on the heat exchanger 22 when the controller 20 senses an output temperature effect of the heat exchanger 22 is at or above approximately 38° F. as illustrated by the "cut-in" horizontal line 26 of FIG. 10 regardless of the ambient temperature represented by the X coordinant. However, the controller 20 will turn off or "cut-out" the heat exchanger 22 on a substantially straight line sliding scale as represented by the line 27 of FIG. 10 when the output temperature effect of the heat exchanger 22 has fallen to a lower temperature below the "cut-in" temperature of line 26 in relation to the ambient temperature whereby it can be seen that when the ambient temperature is respectively 110° F., 90° F. and 50° F. the cut out temperature of the controller 20 is respectively and approximately 22° F., 20° F. and 17° F.

In the above example of the controller 20 in the control system 21, it has been found that when the control system 21 is controlling the temperature of a beverage, such as in a beverage dispenser, and the controller 20 is sensing the temperature of the refrigerant coil of the heating means as represented by the Y coordinant of FIG. 10, the controller 20 in performing the functions disclosed in FIG. 10 will supply the beverage at the most constant and desired palatable temperature to the consumer without overshoot normally caused by the outside temperature as represented by the ambient temperature of the X coordinant of FIG. 10.

The details of the controller 20 for performing the above function will now be described and reference is made to the aforementioned U.S. patent to Good, U.S. Pat. No. 3,447,116, for a detailed description of the basic parts and operation thereof as this invention is an improvement on such a controller to provide for the above described compensation in the "cut-out" sensing condition of the controller 20 in relation to ambient temperature to provide the straight line sliding scale cut out temperature in relation to ambient temperature as previously described in connection with FIG. 10.

Accordingly, only the details of the controller 20 necessary to understand the present invention will now be described as the aforementioned patent to Good, U.S. Pat. No. 3,447,116, can be utilized for a further description of the details and operation thereof.

Referring now to FIGS. 2 and 4, the controller 20 of this invention comprises a housing means 28 carrying a condition responsive means 29 having a movable projection 30 of a movable wall that moves upwardly in FIG. 4 upon an increase in temperature sensed by a conventional temperature sensing bulb (not shown) fluidly interconnected to the chamber of the device 29 by the conventional capillary tube 31. Conversely, upon a decrease in temperature sensed by the bulb portion of the condition responsive means 29, the projection 30 moves downwardly in FIG. 4.

An electrical switch or actuator 32 is also carried by the housing means 28 and has a movable lever 33, FIG. 4, which has a normal tendency or bias to move to the left in FIG. 4 and when moved a predetermined distance to the left in FIG. 4 will cause the switch 32 to interconnect the power source leads $L_1$ and $L_2$ to the leads 23 and 24 of the heat exchanger 22 to turn on or "cut-in" the heat exchanger 22.

Conversely, when the lever 33 of the electrical switch 32 is moved to the right in FIG. 4 in opposition to the normal bias thereof a certain amount, the electrical switch 32 disconnects the power source leads $L_1$ and $L_2$ from the leads 23 and 24 of the heat exchanger 22 to, in effect, turn off or "cut-out" the heat exchanger means 22.

A substantially L-shaped lever 34 is pivotally carried by the housing means 28 by having its lower or horizontal leg 35, adjacent its juncture 36 with its upper or vertical leg 37, pivoting on knife edges 38 of fulcrum members 39 respectively fulcrumed on knife edges 40 of the housing means 28 in the manner illustrated in FIG. 5 whereby the lever means 34 will be pivoted in a counterclockwise direction in FIG. 4 by the condition responsive means 29 sensing an increase in temperature and will be pivoted in a clockwise direction when the condition responsive means 29 senses a decreasing output effect of the heat exchanger means 22. An adjustable range spring 41 is carried by the housing means 28 and has one end 42 operatively bearing against the arm 35 of the lever 34 to tend to move the same in a clockwise direction, the other end 43 of the range spring 41 bearing against an adjustable plate 44 carried by the housing means 28.

A movable shuttle 45 is carried by the housing 28 and is normally urged by spring means (not shown) to the left in FIG. 4 wherein an end plate 46 thereof is disposed against an adjustable member 47 carried by the arm 37 of the lever 34 whereby the shuttle 45 will follow pivotal movement of the arm 37 of the lever 34. Another end plate 48 of the shuttle 45 carries a plunger 49 against which the lever 33 of the electrical switch 32 is normally biased to also follow movement of the shuttle 45 relative to the housing 28.

The controller 20 is so constructed and arranged that the condition responsive means 29 on sensing an increase in temperature in the output effect of the heat exchanging means 22 causes counter clockwise pivoting movement of the lever 34 in FIG. 4 in opposition to the force of the range spring 41 whereby the setting of the upper end 43 of the range spring 41 will determine the temperature which will cause the electrical switch 32 to turn on or "cut-in" the heat exchanger 22 as the lever 33 thereof is permitted to move to the left a sufficient distance at that predetermined temperature to interconnect the power source leads $L_1$ and $L_2$ to the leads 23 and 24 of the heat exchanger 22.

However, in order to provide for the turn off or "cut-out" of the heat exchanger 22 at lower sensed temperatures in relation to lower ambient temperatures as previously described, a differential spring 50 is utilized in a manner now to be described.

As illustrated in FIGS. 3 4 and 7, a pin 51 has a reduced end 52 received in an opening 53 of the bottom wall of the housing means 28 so that the pin 51 has a shoulder 54 resting against the housing 28. The other end 55 of the pin 51 is provided with an outwardly directed flange 56 and an opening 57 interrupting the same to receive an end 58 of another pin means 59 having its other end 60 bearing against a movable wall 61 of a bellows construction 62 having the other end 63 thereof bearing against the upper wall of the housing 28.

The pin means 59 has an intermediate threaded section 64 threadedly receiving a plate 65 at a threaded opening 66 thereof. The plate 65 has a U-shaped cutout 67 which straddles a frame part 68 of the housing 28 in the manner illustrated in FIGS. 2, 3 and 6 so as to prevent rotation of the plate 65 while permitting axial movement thereof relative to the pin means 59 when the head 60 of the pin means 59 is rotated in a desired adjusting direction to position the plate 65 axially thereon.

The differential spring 50 is a tension spring and has its upper end 69 interconnected to a tang 70 of the plate 65 while its lower end 71 in interconnected to opposed projections 72 at the upper end 73 of a hollow sleeve 74 telescoped on the pin 51 and having a lower annular flange 75 whereby the force of the tension spring 50 normally tends to move the sleeve 74 upwardly until the end 73 thereof abuts against the annular flange 56 of the pin means 51 in the manner illustrated in FIG. 4.

A compression spring 76 is disposed about the pin means 59 inboard of the tension spring 50 and has its upper end 77 bearing against a shoulder 78 of the pin 59 and its lower end 79 bearing against the annular flange 56 of the pin 51 whereby the compression spring 76 being stronger than the tension spring 50 will maintain the head 60 of the pin 59 always against the movable wall 61 of the bellows construction 62 for a purpose hereinafter described.

The interior of the bellows construction 62 is interconnected by a capillary tube 80 to a temperature sensing bulb 81, FIG. 1, which is located to sense the ambient temperature, such as room temperature or outside temperature when the controller 20 is being utilized to control the heat exchange means 22 for a beverage dispenser or the like.

The right hand end 82 of the arm 35 of the lever 34 is bifurcated so as to straddle the sleeve 74 and be adapted to engage against the upper surface of the annular flange 75 thereof in a manner hereinafter described and as fully illustrated in FIGS. 3 and 4.

By rotating the enlarged head 60 of the pin means 59 relative to the housing 28, the axial position of the plate 65 threaded thereon is adjusted and, correspondingly, the tension force of the tension spring 50 tending to pull upwardly on the sleeve 74 is adjusted.

Figure 9:
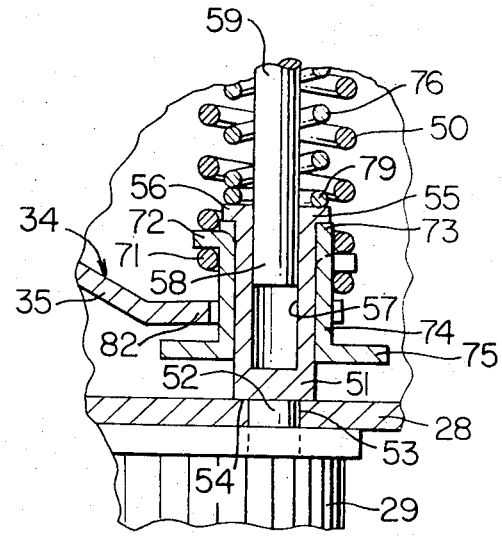
FIG. 9 is a view similar to FIG. 8 and illustrates the lever means in another operating position thereof.

The sleeve 74 bottoms out against the flange 56 of the pin means 51 as illustrated in FIG. 4 when the condition responsive means 29 expands to pivot the lever 34 in a counterclockwise direction in opposition to the force of the range spring 41 before the lever 33 of the electrical switch 32 has moved to the left in FIG. 4 at a distance sufficient to interconnect the power source leads $L_1$ and $L_2$ to the leads 23 and 24 of the heat exchanger means 22 thus, the lever 34 must be further pivoted in a counterclockwise direction by the condition responsive means 29 as illustrated in FIG. 9 whereby the end 82 of the arm 35 of the lever 34 has completely moved away from the annular flange 75 of the sleeve 74 before the lever 33 of the switch 32 has been moved to the left a distance sufficient to turn on the heat exchanger 22. Thus, since the force of the spring 50 does not aid in causing this further counterclockwise movement of the arm 35 after the sleeve 74 bottoms out against the flange 56, the spring 50 can not effect the turn on or "cut-in" temperature.

Figure 8:
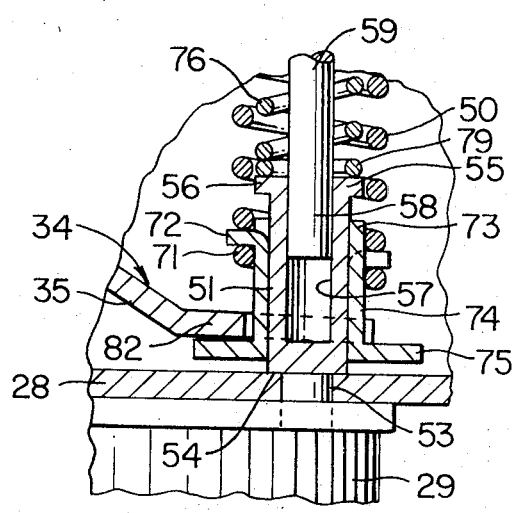
FIG. 8 is an enlarged fragmentary cross-sectional view of the lever and differentiating spring arrangement of the controller of this invention.

However, as the temperature output effect of the heat exchanging means 22 that is being sensed by the condition responsive means 29 decreases, the condition responsive means 29 causes the movable member 30 to move downwardly whereby the lever 34 begins to pivot in a clockwise direction. However, the lever 34 does not pivot in a clockwise direction an amount sufficient to cause movement of the lever 33 back to the right a distance sufficient to turn off the heat exchanger 22 until after the end 82 of the lever 34 has again engaged the flange 75 of the sleeve 74 and moved the same downwardly as illustrated in FIG. 8 completely away from the flange 56 of the pin 51. In this manner, the tension spring 50 retards such clockwise movement of the lever 34 until the combined effect of the range spring 41 and the collapsing fluid pressure in the condition responsive means 29 overcomes the force of the tension spring 50 to permit the lever 34 to pivot in a clockwise direction sufficiently as illustrated in FIG. 8 to cause the lever 33 of the electrical switch 32 to move to the right and disconnect the power source leads $L_1$ and $L_2$ from the heat exchanger 22 to turn off or "cut-out" the exchanger 22.

However, as previously described, the temperature sensing bulb 81 for the bellows construction 62 is sensing the ambient temperature and should the ambient temperature surrounding the control 20 be relatively high, such as 110° F., the fluid in the bulb 81 has expanded to such a degree that the same causes the bellows construction 62 to expand and the wall 61 thereof to move downwardly and carry the pin means 59 therewith in opposition to the force of the compression spring 76 whereby such downward movement of the pin 59 also carries the plate 65 downwardly therewith so that the resulting force of the tension spring 50 tending to retard the clockwise movement of the lever 34 is correspondingly decreased. Thus, with a decrease in the force of the tension spring 50 tending to retard clockwise movement of the lever 34 to turn off the heat exchanger 22, the heat exchanger 22 will be turned off at a higher output temperature effect of the heat exchanger 22 as represented by the line 27 in FIG. 10. However, should the ambient temperature decrease, the bellows construction 62 correspondingly collapses so that the compression spring 76 moves the pin means 59 upwardly whereby the force of the tension spring 50 is correspondingly increased in its attempt to retard clockwise movement of the lever 34. Thus, the increased force of the tension spring 50 requires a lowering of the output temperature effect of the heat exchanger means 22 before the lever 34 will cause the switch 32 to turn off the heat exchanging means 22 as fully represented by the sliding scale substantially straight line 27 of FIG. 10.

Thus, it can be seen that the differential spring parts of FIG. 7 permits the controller 20 to cut in the heat exchanger 22 at a certain temperature regardless of the ambient temperature while causing the controller 20 to cut out the heat exchanger 22 at a lower temperature that is on a substantially straight line sliding scale in relation to the ambient temperature being sensed by the controller 20.

Accordingly, not only does this invention provide an improved controller, but also this invention provides an improved control system and an improved method for utilizing such a controller or the like.

While the form of the invention now preferred has been disclosed as required by statute, other forms may be used, all coming within the scope of the claimed subject matter which follows.

What is claimed is:

1. A controller comprising a housing, an actuator means carried by said housing for controlling a heat exchanger, a condition responsive means carried by said housing to be responsive to the output of said heat exchanger, transmitting means operatively interconnecting said condition responsive means to said actuator means whereby said condition responsive means will tend to actuate said actuator means when sensing an actuating output condition of said heat exchanger and will tend to deactuate said actuator means when sensing a deactuating output condition of said heat exchanger, and an ambient condition responsive device operatively interconnected to said transmitting means to substantially infinitely vary within certain limits and in relation to the ambient condition sensed by said device only one of the actuating and deactuating output conditions that said condition responsive means must sense in operating said actuator means, said transmitting means comprising a lever pivotally mounted in said housing, said transmitting means comprising an adjustable range spring carried by said housing and being operatively interconnected to said lever to tend to pivot said lever in one direction for tending to set said actuating and deactuating conditions of said condition responsive means, said transmitting means comprising differential creating spring means carried by said housing and being operatively interconnected to said lever to tend to pivot said lever in a direction opposite to said one direction for creating a differential between the actuating condition and deactuating condition, said ambient condition responsive device being operatively interconnected to said differential creating spring means to vary the force of said spring means tending to pivot said lever in said opposite direction in relation to the ambient condition sensed.

2. A controller as set forth in claim 1 wherein said spring means retards pivotal movement of said lever means only in its direction of movement for deactuating said actuator.

3. A controller as set forth in claim 2 wherein said ambient condition responsive device comprises a bellows construction carried by said housing.

4. A controller as set forth in claim 1 wherein said ambient condition responsive device is responsive to ambient temperature.

5. A controller as set forth in claim 4 wherein said condition responsive means is responsive to the output temperature effect of said heat exchanger.

6. A controller as set forth in claim 1 wherein said ambient condition responsive device varies only said deactuating condition of said condition responsive means.

7. A controller as set forth in claim 1 wherein said actuator means is an electrical switch.

8. A controller as set forth in claim 1 wherein said one output condition of said heat exchanger is varied in substantially a straight line relation to the ambient condition sensed by said device.

* * * * *